(12) United States Patent
Misu

(10) Patent No.: US 9,747,812 B2
(45) Date of Patent: Aug. 29, 2017

(54) SALIENCY BASED AWARENESS MODELING

(71) Applicant: Honda Motor Co., Ltd., Minato-ku, Tokyo (JP)

(72) Inventor: Teruhisa Misu, Mountain View, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 392 days.

(21) Appl. No.: 14/521,167

(22) Filed: Oct. 22, 2014

(65) Prior Publication Data

US 2016/0117947 A1    Apr. 28, 2016

(51) Int. Cl.
| | |
|---|---|
| *G09B 9/04* | (2006.01) |
| *B60W 50/08* | (2012.01) |
| *B60W 50/14* | (2012.01) |
| *G09B 19/16* | (2006.01) |

(52) U.S. Cl.
CPC .......... *G09B 9/04* (2013.01); *B60W 50/085* (2013.01); *B60W 50/14* (2013.01); *G09B 19/16* (2013.01); *G09B 19/167* (2013.01); *B60W 2050/143* (2013.01); *B60W 2050/146* (2013.01)

(58) Field of Classification Search
CPC ...... G08B 21/06; G08B 21/0476; A61B 5/18; A61B 3/113; A61B 5/11; A61B 5/1114; B60R 2300/8093; G09B 19/16; G09B 19/167; G09B 9/04
USPC .............................................. 434/29, 62, 65
See application file for complete search history.

(56) References Cited

U.S. PATENT DOCUMENTS

| | | |
|---|---|---|
| 6,496,117 B2 | 12/2002 | Gutta et al. |
| 6,974,414 B2 | 12/2005 | Victor |
| 6,989,754 B2 | 1/2006 | Kisacanin et al. |
| 7,403,124 B2 | 7/2008 | Arakawa et al. |
| 7,428,449 B2 | 9/2008 | Fehr et al. |
| 7,455,405 B2 | 11/2008 | Victor et al. |
| 7,519,459 B2 | 4/2009 | Ito et al. |
| 7,532,958 B2 | 5/2009 | Powers et al. |
| 7,593,013 B2 | 9/2009 | Agutter et al. |
| 7,639,148 B2 | 12/2009 | Victor |
| 7,705,738 B2 | 4/2010 | Fukaya et al. |
| 7,880,621 B2 | 2/2011 | Kalik |
| 7,982,618 B2 | 7/2011 | Omi et al. |

(Continued)

*Primary Examiner* — Andrew Iwamaye
*Assistant Examiner* — Jerry-Daryl Fletcher
(74) *Attorney, Agent, or Firm* — Arent Fox LLP

(57) ABSTRACT

In one or more embodiments, driver awareness may be calculated, inferred, or estimated utilizing a saliency model, a predictive model, or an operating environment model. An awareness model including one or more awareness scores for one or more objects may be constructed based on the saliency model or one or more saliency parameters associated therewith. A variety of sensors or components may detect one or more object attributes, saliency, operator attributes, operator behavior, operator responses, etc. and construct one or more models accordingly. Examples of object attributes associated with saliency or saliency parameters may include visual characteristics, visual stimuli, optical flow, velocity, movement, color, color differences, contrast, contrast differences, color saturation, brightness, edge strength, luminance, a quick transient (e.g., a flashing light, an abrupt onset of a change in intensity, brightness, etc.).

20 Claims, 7 Drawing Sheets

(56) References Cited

U.S. PATENT DOCUMENTS

| | | |
|---|---|---|
| 8,135,507 B2 | 3/2012 | Okabe |
| 8,164,464 B2 | 4/2012 | Matos |
| 8,280,588 B2 | 10/2012 | Inou et al. |
| 8,344,894 B2 | 1/2013 | Szczerba et al. |
| 8,401,714 B2 | 3/2013 | Inou et al. |
| 8,489,252 B2 | 7/2013 | Inou et al. |
| 8,629,784 B2 | 1/2014 | Szczerba et al. |
| 8,629,903 B2 | 1/2014 | Seder et al. |
| 8,698,639 B2 | 4/2014 | Fung et al. |
| 8,704,653 B2 | 4/2014 | Seder et al. |
| 2005/0278098 A1* | 12/2005 | Breed ................ B60R 21/0134 701/45 |
| 2010/0156617 A1 | 6/2010 | Nakada et al. |
| 2010/0253526 A1* | 10/2010 | Szczerba ............. B60K 28/066 340/576 |
| 2010/0292886 A1 | 11/2010 | Szczerba et al. |
| 2010/0305755 A1* | 12/2010 | Heracles ............. G06K 9/4671 700/253 |
| 2012/0174111 A1 | 7/2012 | Pala et al. |
| 2012/0200490 A1 | 8/2012 | Inada |
| 2012/0271484 A1 | 10/2012 | Feit et al. |
| 2013/0058529 A1 | 3/2013 | Levin et al. |
| 2013/0325202 A1 | 12/2013 | Howard et al. |
| 2014/0091989 A1 | 4/2014 | Szczerba et al. |
| 2014/0139655 A1 | 5/2014 | Mimar |
| 2014/0204193 A1 | 7/2014 | Zhang et al. |
| 2014/0210978 A1* | 7/2014 | Gunaratne ......... G06K 9/00604 348/77 |
| 2015/0086077 A1* | 3/2015 | Du .................... G06K 9/00369 382/104 |

* cited by examiner

SALIENCY BASED AWARENESS MODELING

BACKGROUND

Often, accidents, collisions, crashes, etc. may be caused by a variety of factors. For example, crashes may be caused by operator error, recognition error, decision errors, faulty equipment, performance errors, non-performance errors, or other errors. Examples of recognition error may include inadequate surveillance, internal distractions, external distractions, inattention, daydreaming, or other recognition errors. Examples of decision errors may include operating a vehicle at a velocity too fast for corresponding driving conditions, such as road segment topology, road surface conditions, temperature, visibility, etc. Other examples of decision errors may include false assumptions by an operator of a vehicle (e.g., assuming another vehicle or another operator of another vehicle was turning in a different direction), illegal maneuvers, misjudgment of following distance, misjudgment of speed of vehicle, misjudgment of speed of another vehicle, following too closely, aggressive driving behavior, or other decision errors. Performance errors may include overcompensation, poor directional control, panic, or behaving with a freeze response. Non-performance errors may include falling asleep at the wheel, experiencing a medical condition or physical impairment, such as a heart attack, or other condition. Regardless, a great deal of accidents, collisions, or crashes often result from a lack or gap in awareness of an operator of a vehicle, such as distractions, inattention, false assumptions, or misjudgments, for example. Accordingly, it may be desirable to mitigate distractions for operators or drivers of vehicles.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

In one or more embodiments, saliency based awareness modeling may be provided. For example, operator awareness of one or more objects in an operating environment may be modeled based on eye tracking or saliency, such as visual saliency. An awareness model may be constructed based on saliency or a saliency model for one or more objects in the operating environment. To construct such an awareness model, objects within the operating environment may be modeled (e.g., via an operating environment model) and saliency of one or more of the objects may be observed (e.g., via a saliency model, a predictive model, etc.). As an example, the operating environment may be modeled by detecting one or more objects surrounding a vehicle, within an operating environment, or by detecting the surroundings of the vehicle. Here, in this example, as a vehicle is traveling through the operating environment, one or more objects may be tracked, monitored, sensed, or detected. As discussed, an object may be a potential hazard, a hazard, a potential obstacle, an obstacle, a physical object, a task, a line of communication, attention demanding or non-attention demanding, etc.

However, because it may not be desirable to present an operator of a vehicle with every possible notification regarding one or more of the respective objects, the system for saliency based awareness modeling may filter or select one or more objects for notification. In other words, the system for saliency based awareness modeling may selectively present or render one or more alerts or one or more notifications associated with one or more selected objects. These notifications may be presented to an operator of a vehicle in a context appropriate manner. As an example, context appropriateness may be determined based on one or more factors, such as saliency, visual saliency, operator awareness, one or more operator responses, one or more operator attributes, or operator behavior. In this way, the system for saliency based awareness modeling may determine how alert or aware a driver or operator of a vehicle is with respect to one or more objects and notify the operator in a context appropriate manner (e.g., according to the given context or scenario).

An awareness model may correspond to an operating environment model or a saliency model. For example, one or more objects within an operating environment model may be assigned one or more awareness scores based on one or more factors discussed herein, such as the saliency model. Awareness scores for respective objects may be generated based on one or more object attributes (e.g., saliency, proximity of an object with respect to the vehicle), predictive modeling associated with the object (e.g., a likelihood that the object will move or become an obstacle, etc.), operator behavior, one or more operator attributes, or one or more operator responses (e.g., how a driver reacts versus or compared with expected responses, such as how a driver should react or would be expected to react given awareness of an object).

In one or more embodiments, the selection of an object (e.g., for notification) or determination of an awareness score for that object within an awareness model may be based on a variety of factors, such as saliency of one or more objects with respect to an operating environment. In other words, visual cues associated with an object may be utilized to determine a likelihood that the object is visible (e.g., without necessarily requiring confirmation that an operator focused on that object via an eye tracking device or similar sensor). Other factors may be utilized to determine or infer awareness or an awareness score, such as predictive modeling (e.g., predictive actions) associated with one or more objects, one or more operator attributes, operator behavior, one or more operator responses (e.g., one or more operator reactions, one or more maneuvers, one or more operations, etc.), presence of one or more occupants in a vehicle, one or more communications, one or more applications, one or more attention demanding objects, a number of attention demanding objects, multi-tasking, feedback, one or more operator preferences, one or more baselines associated therewith, or any combination thereof.

As an example, if a vehicle is equipped with a system for saliency based awareness modeling senses an object, such as a patrol vehicle or law enforcement vehicle on the side of a roadway, the presence or presence information of the law enforcement vehicle may be noted or associated with an operating environment model and tracked as an object within the operating environment model. One or more aspects associated with the object may be detected and utilized to build or construct a saliency model which corresponds to the operating environment model or one or more objects within the operating environment model. Here, in this example, one or more saliency parameters associated with the law enforcement vehicle may be indicative of a state, a quality, or visibility by which the law enforcement vehicle stands out relative to the operating environment in which the law enforcement vehicle exists. In this regard, if the law enforcement vehicle has its emergency lights engaged, activated, or lit up, one or more saliency parameters of the saliency model associated with the law enforcement vehicle may indicate that the brightness or change in brightness associated with the flashing lights of the vehicle may cause the law enforcement vehicle to be more easily identified by the driver or operator of the vehicle. Accordingly, a notification may (e.g., or may not) be provided to a driver or operator of a vehicle based on whether the lights of the law enforcement vehicle are engaged, whether the driver has changed lanes, provided appropriate clearance, etc. Further, a saliency model or awareness model for an object may be adjusted based on a state of an operator, a length of a trip, a time of day, a level of traffic, proximity of an object, size of an object, etc.

In one or more embodiments, a system for saliency based awareness modeling may forego providing an operator of a vehicle with a notification for the law enforcement vehicle if the emergency lights of the law enforcement vehicle are engaged (e.g., due to the visibility or saliency of the emergency lighting system of the law enforcement vehicle). If the lights of the law enforcement vehicle are turned off at a later time, the system for saliency based awareness modeling may track the law enforcement vehicle and mitigate or prevent notifications from being provided based on a likelihood that an operator has already seen the law enforcement vehicle prior to the emergency lighting system being deactivated. In this way, the system for saliency based awareness modeling may utilize predictive modeling to 'remember' that an operator is likely to be aware of an object after a state of the object changes or attributes (e.g., saliency) associated with the object change.

As discussed, other factors may be utilized to facilitate construction of awareness scores or a corresponding awareness model. For example, operator behavior (e.g., eye tracking), one or more operator attributes, or one or more operator responses (e.g., accelerating, steering, turning, braking, signaling, etc.) may be detected or monitored. If eye tracking indicates that an operator of a vehicle has focused his or her eyes on an object for a threshold period of time, the awareness score for the corresponding object may be increased within the awareness model. Similarly, if the operator of the vehicle steers around an object in advance or directs the vehicle on a trajectory away from the object, the awareness score may be increased for the same reasons. Here, in this example, the system for saliency based awareness modeling may withhold notifications if an operator of a vehicle has shifted lanes (e.g., operator response) to provide a safe clearance for the law enforcement officer or law enforcement vehicle.

Because a driver or an operator of a vehicle generally has a limited amount of cognition or awareness as a resource, it may be advantageous to selectively provide notifications based on saliency, object attributes, operator response, operator attributes, or operator behavior. For example, a driver of a vehicle may only be able to effectively pay attention to up to seven objects in a concurrent fashion. Accordingly, the system for saliency based awareness modeling may mitigate, manage, select, or target notifications or alerts presented to an operator of a vehicle based on one or more object attributes, saliency, operator behavior, operator attributes, operator response, driving conditions, etc. In other words, because an operator or driver of a vehicle may only pay attention to a limited number of objects, modeling driver awareness based on saliency of objects may mitigate generation of excess notifications, thereby reducing the amount of operator cognition consumed.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
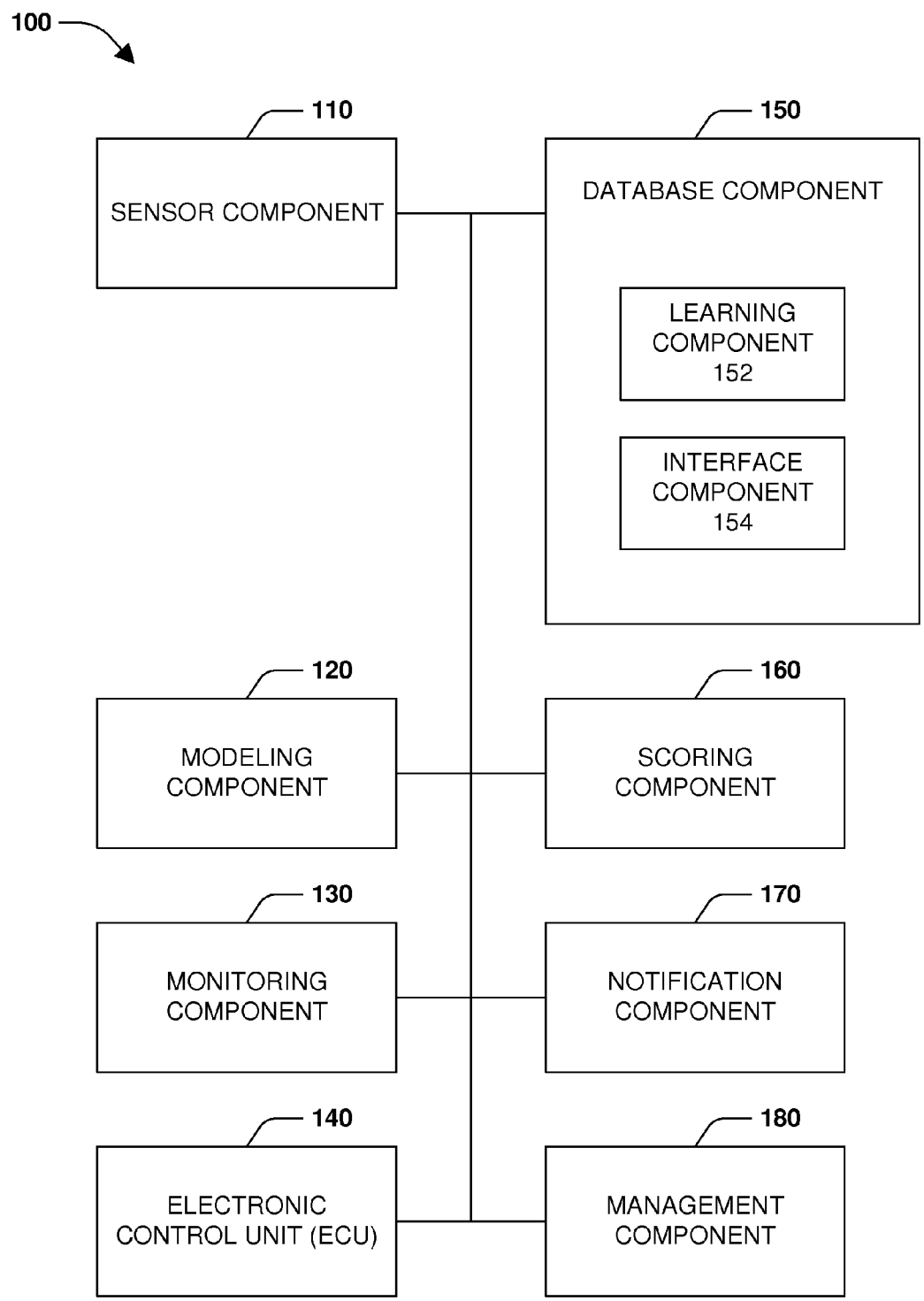
FIG. 1 is an illustration of an example component diagram of a system for saliency based awareness modeling, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 7:
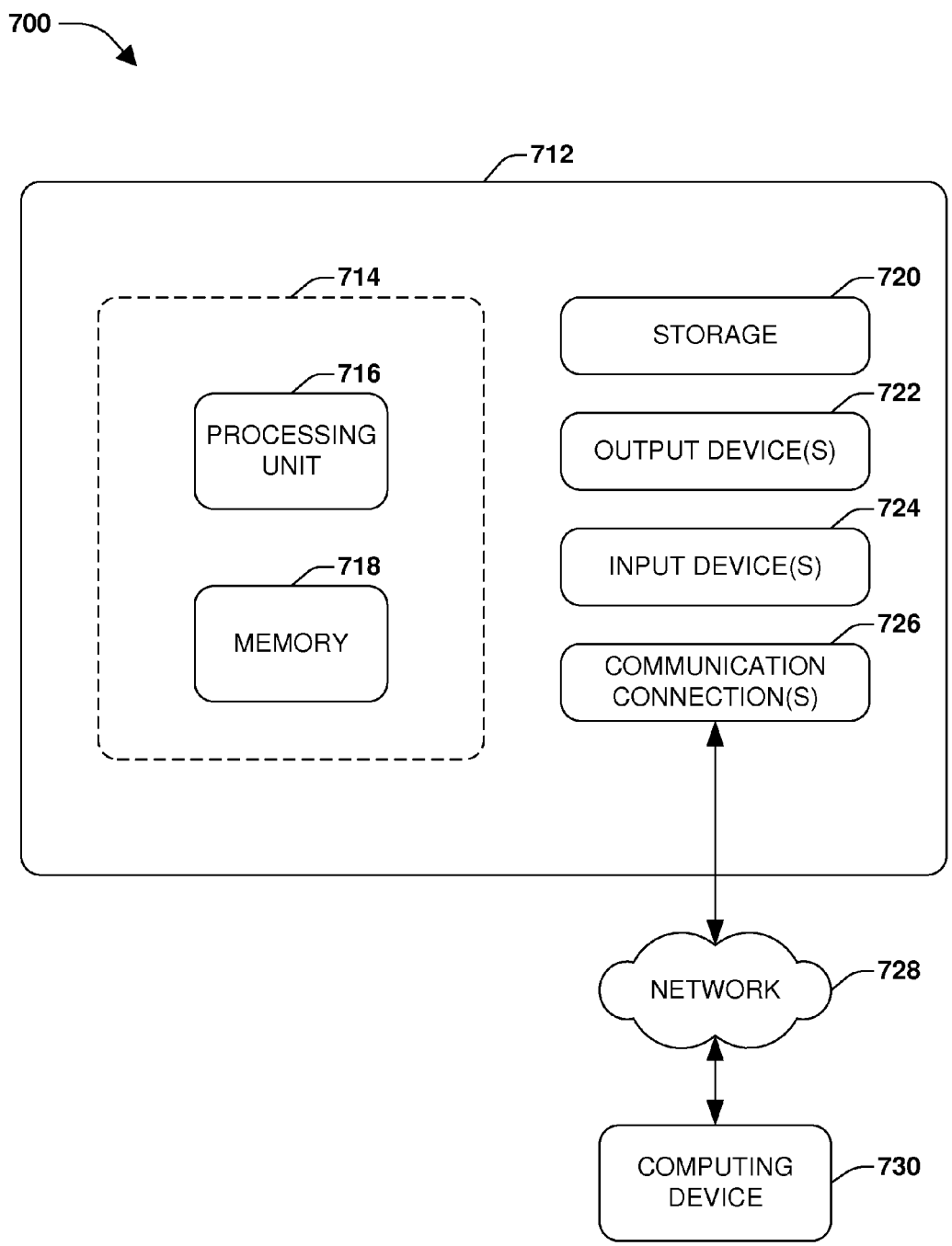
FIG. 7 is an illustration of an example computing environment where one or more of the provisions set forth herein are implemented, according to one or more embodiments.

For one or more of the figures herein, one or more boundaries, such as boundary 714 of FIG. 7, for example, may be drawn with different heights, widths, perimeters, aspect ratios, shapes, etc. relative to one another merely for illustrative purposes, and are not necessarily drawn to scale. For example, because dashed or dotted lines may be used to represent different boundaries, if the dashed and dotted lines were drawn on top of one another they would not be distinguishable in the figures, and thus may be drawn with different dimensions or slightly apart from one another, in one or more of the figures so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but may encompass a portion of one or more other components as well.

The following terms are used throughout the disclosure, the definitions of which are provided herein to assist in understanding one or more aspects of the disclosure.

As used herein, an occupant of a vehicle may include a driver of a vehicle, an operator of a vehicle, an individual, an entity, a person, a passenger, etc. As used herein, an operator of a vehicle may be a driver of a vehicle or an occupant who provides one or more vehicle operations or commands to the vehicle, such as steering commands, for example.

As used herein, an operating environment may be a driving environment or a real world environment through which a vehicle travels, traverses, operates, or moves. An operating environment may include one or more roadways, other vehicles, objects, hazards, etc. As used herein, an object may include an obstacle, a potential obstacle, a hazard, a potential hazard, other vehicles, a person, a pedestrian, an animal, a pothole, road kill, physical objects, etc. Additionally, an object may include non-tangible objects or items which may demand a portion of attention from an operator of a vehicle, such as a line of communication, a task, a notification, an alert, etc. As used herein, an attention demanding object may be an object which requires, utilizes, or demands a portion of focus or some attention from an operator of a vehicle.

Examples of attention demanding objects are a telephonic conversation (e.g., due to the nature of communication, conversation, or multi-tasking between the conversation and operating the vehicle) or an application with which an operating is interacting, such as by adjusting volume of a radio station or selecting a track on a music application. After an operator has adjusted the volume of the radio station, the corresponding radio or music application may require less focus from the driver, and thus become a non-attention demanding object. In other words, attention demanding objects may become merely 'objects' or non-attention demanding objects when an operator of a vehicle shifts his or her focus to other objects or other tasks, such as concentrating on driving, for example. As used herein, awareness may include attention, focus, concentration, cognition, etc.

As used herein, a notification may include an alert which may be presented or rendered in a variety of formats, such as an audio alert, a graphic element, a video, an animation, a tactile response, a vibratory alert, modification of one or more vehicle systems or vehicle components, etc. In other words, a notification may include one or more adjustments, compensation, responses, or reactions to one or more objects. For example, visual devices, audio devices, tactile devices, antilock brake systems, brake assist systems, cruise control systems, stability control systems, collision warning systems, lane keep assist systems, blind spot indicator systems, pretensioning systems, climate control systems, etc. may be adjusted or controlled to implement a notification. Regardless, a notification may provide a stimulus for one or more senses of an occupant of a vehicle.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

In one or more embodiments, driver awareness may be calculated, inferred, or estimated utilizing a saliency model, a predictive model, or an operating environment model. An awareness model including one or more awareness scores for one or more objects may be constructed based on the saliency model or one or more saliency parameters associated therewith.

FIG. 1 is an illustration of an example component diagram of a system 100 for saliency based awareness modeling, according to one or more embodiments. In one or more embodiments, the system 100 for saliency based awareness modeling may include a sensor component 110, a modeling component 120, a monitoring component 130, an electronic control unit 140, a database component 150, a scoring component 160, a notification component 170, and a management component 180. The database component may include a learning component 152 or an interface component 154. The interface component 154 may be implemented as a standalone component of the system 100 for saliency based awareness modeling in one or more other embodiments.

The sensor component 110 may detect or analyze the surroundings of a vehicle, a surrounding environment of a vehicle, or one or more objects within an operating environment, such as extra-vehicular objects (e.g., objects outside of the vehicle). For example, the sensor component 110 may track, monitor, detect, sense, or capture one or more of the objects, which may be potential hazards, potential obstacles, etc. and report respective objects to the modeling component 120 to facilitate construction of an operating environment model. Explained another way, the sensor component 110 may identify one or more objects, obstacles, hazards, or potential hazards within an operating environment. The sensor component 110 may include an image capture device, an image acquisition device, a radar sensor, a light detection and ranging (LIDAR) sensor, a laser sensor, a video sensor, a movement sensor, etc.

The sensor component 110 may detect one or more objects, presence information associated with one or more objects, or one or more attributes associated with one or more of the objects (e.g., object attributes), such as attributes associated with saliency of an object. In one or more embodiments, the sensor component 110 may generate one or more saliency parameters based on one or more of the object attributes. These saliency parameters may be indicative of a characteristic or attribute by which an object stands out relative to an environment, such as the operating environment in which the object is within, for example. Explained another way, a saliency parameter may be indicative of a characteristic which distinguishes an object from neighbors of that object. Thus, the sensor component 110 may detect saliency associated with one or more objects and generate one or more saliency parameters in this way.

Examples of object attributes associated with saliency or saliency parameters may include visual characteristics, visual stimuli, optical flow, velocity, movement, color, color differences, contrast, contrast differences, color saturation, brightness, edge strength, luminance, a quick transient (e.g., a flashing light, an abrupt onset of a change in intensity, brightness, etc.). In one or more embodiments, the sensor component 110 may detect one or more object attributes (e.g., which are not necessarily associated with saliency).

Examples of such object attributes may include proximity of an object to a vehicle, the type of object or class of object (e.g., signage, vehicle, pedestrian), etc. Examples of other object attributes may include proximity of an object from a vehicle, angle of an object from a trajectory of a vehicle or roadway. Respective saliency parameters or object attributes may be utilized to generate a saliency model for one or more objects. A saliency model for an object may be indicative of a likelihood that the object or portions of the object may be seen by an occupant of a vehicle based on characteristics of the object which make the object appear to stand out from its neighbors. In other words, the saliency model may be utilized to determine how likely an object is to get the attention of a driver or operator of a vehicle at a glance (e.g., without applying eye tracking or taking operator behavior into account).

The modeling component 120 may construct or build an operating environment model based on presence information associated with one or more objects. The operating environment model may track one or more coordinates or a position associated with one or more of the objects. Additionally, the modeling component 120 may tag one or more of the objects with metadata which may be indicative of one or more object attributes of one or more of the objects, such as whether or not an object has moved, for example. Regardless, the operating environment model may be associated with one or more objects and one or more corresponding object attributes for one or more of the respective objects.

The modeling component 120 may construct or build a saliency model for one or more objects from an operating environment model based on one or more saliency parameters associated with one or more of the objects. In other words, if an object within an operating environment appears to stand out from neighbors within the operating environment or from the operating environment itself in a visually salient manner, the modeling component 120 may construct the saliency model such that the saliency model is indicative or quantifies the visibility of that object (e.g., with respect to the surrounding environment or operating environment).

The saliency model may be utilized to update or influence an awareness model associated with the same object. In other words, if the saliency model indicates that an object stands out relative to its neighbors or the operating environment, the awareness model may assign that object a higher awareness score which indicates that there is a higher likelihood that an operator of a vehicle may become aware of the object (e.g., even when eye tracking indicates that the operator of the vehicle hasn't necessarily focused his or her eyes directly on that object). Explained yet another way, the awareness model may be constructed or built based on the saliency model. In this way, driver awareness or operator awareness may be modeled accordingly to saliency or visual saliency.

In one or more embodiments, the modeling component 120 may build or construct a predictive model for one or more objects of the operating environment model. The predictive model may be indicative of one or more inferences or predictive actions associated with one or more of the objects within the operating environment. For example, the predictive model may include inferences for whether an object is likely to move, whether an object is likely to become an obstacle or a hazard, a likelihood that an object is alive, an estimated risk score associated with an object, etc. In other words, the modeling component 120 may build a predictive model for one or more objects having one or more estimated risk scores. An estimated risk score may be indicative of a likelihood of a risk associated with the object, such as a risk of collision with the object, for example. However, not necessarily all risks may be associated with collisions. For example, a missed stop sign may result in a traffic violation. In this way, the modeling component 120 may build or construct a predictive model based on one or more object attributes observed by the sensor component 110, the operating environment model, or the saliency model for one or more respective objects.

As an example, if the sensor component 110 detects a first object, such as a deer, the sensor component 110 may notate or store one or more object attributes associated with the deer within the operating environment model. The operating environment may include object attributes such as whether or not the deer moved, a velocity at which the deer moved (if at all), the proximity of the deer from the vehicle, etc. Here, in this example, the modeling component 120 may build a predictive model associated with the first object or the deer. If the deer is near a wooded area or another area where one or more other objects may obstruct the view of an operator or driver of the vehicle, the predictive model may infer a possibility that other deer may be around the area. Accordingly, it may be seen that the modeling component 120 may build a predictive model based on a layout of an operating environment (e.g., objects which may cause an obstructed view), one or more object attributes (e.g., movement of the deer or the deer crossing the road), or one or more objects (e.g., the deer).

In one or more embodiments, the predictive model may focus on obstacles or objects on the same side of the roadway as the deer (e.g., because other objects or packs of deer may be nearby). Additionally, the predictive model may utilize eye gaze information to supplement predictive modeling of one or more objects. For example, if the monitoring component 130 detects that an operator of a vehicle is focused on a pack of deer to the right of the vehicle, then it may be more likely that saliency or other cues may be missed on objects to the left of the vehicle. In this way, the modeling component 120 may build a predictive model which may compensate for limited operator cognition.

In other embodiments, the predictive model may be built, assembled, or constructed based on one or more object attributes. For example, a first pedestrian who is paying attention to the roadway may be assigned a lower estimated risk score, while a second pedestrian who is texting and walking may be assigned a higher estimated risk score indicative of the inattention of the second pedestrian. Here, because the second pedestrian is a higher risk object, the predictive model for the second pedestrian may be indicative of such higher risk.

Further, in one or more embodiments, the modeling component 120 may build or construct a predictive model based on one or more navigation instructions, an estimated navigation route, or use of navigation or telematics (e.g., via the electronic control unit 140 or ECU). For example, if a driver or operator of a vehicle is driving a vehicle in a right lane of a roadway with three lanes: a right lane, a center lane, and a left lane, and navigation is slated to direct the operator to change lanes from the right lane to the left lane, upcoming hazards or objects detected may be prioritized based on the navigation or navigation instructions. In other words, the modeling component 120 may build or construct the predictive model with a focus on objects on the left side of the road based on anticipated navigation instructions which may direct an operator to change lanes from the right lane to the left lane of the roadway. Here, in this example, objects on the right side of the roadway may be assigned lower estimated risk scores than objects on the left side of the roadway based on one or more navigations instructions or anticipated navigation. The management component 180 may present or render fewer notifications associated with objects on the right side of the roadway or prioritize objects on the left side of the roadway accordingly.

In one or more embodiments, the monitoring component 130 may monitor an operator of a vehicle and capture one or more attributes associated with the operator (e.g., operator attributes) of the vehicle. In other words, the monitoring component 130 may track, monitor, detect, sense, or capture one or more operator attributes or operator behavior of the operator of the vehicle, such as eye movement, head movement, focus, body movement or shifting, etc. The monitoring component 130 may include one or more in-vehicle image capture devices, image capture sensors, motion sensors (e.g., to monitor head movement), eye tracking unit, infrared sensors, infrared illuminators, depth sensors (e.g., to monitor driver inattention or a focal point of the driver's eyes), etc. Explained another way, the monitoring component 130 may employ gaze detection to detect inattention, distractions, motion trajectory, face direction trajectories, skeletal information, eye gaze trajectory, gaze distribution, etc. of a driver or operator of a vehicle.

Regardless, the monitoring component 130 may track eye movements of an operator of the vehicle, such as eye-gaze direction, eye-gaze movement, eye diversion, eye-closure, center gaze point, blinking movements, head movements, head positioning, head orientation, one or more facial features (e.g., such as areas surrounding the eyes, the pupils, eye corners, the nose, the mouth, etc. of an occupant), a head pose, a facial pose, facial temperature, or associated positioning, orientation, movements, etc. In this way, one or more operator attributes may be monitored. These operator attributes may be utilized to determine a state of an operator (e.g., whether the operator is sleepy, drowsy, alert, jumpy, inattentive, distracted, etc.). Further, one or more of the operator attributes may be indicative of the positioning of the driver or a pose of one or more portions of the driver's body, such as eyes, head, torso, body, etc.

In one or more embodiments, the modeling component 120 may build or construct an awareness model for an operator of a vehicle based on one or more operator attributes, such as operator attributes detected by the monitoring component 130. Here, these operator attributes may be utilized to determine driver awareness with respect to one or more objects within the operating environment. For example, the monitoring component 130 may determine a gaze time or a time of focus (e.g., utilizing depth sensors) for one or more objects in the operating environment. The time of focus may be a peak amount of time (e.g., a maximum) a driver or operator of a vehicle spends with his or her eyes focused on an object within the operating environment. Further, the monitoring component 130 may track, monitor, or tag an object with a duration or time at which the operator of the vehicle last looked at that object. Effectively, the monitoring component 130 may track whether one or more objects are new to a driver or operator of a vehicle or whether one or more of the objects are stale or perhaps forgotten. Explained yet another way, the monitoring component 130 may tag one or more objects with timestamps indicative of a time at which the driver or operator of the vehicle last focused his or her eyes on that object.

In one or more embodiments, the monitoring component 130 may classify whether an operator of a vehicle is aware of an object based on a length of time the operator is focused on the object. Additionally, the monitoring component 130 may infer a likelihood of whether an operator of a vehicle is aware of a second object based on a length of time the operator is focused on a first object, a perceived distance between the first object and the second object, one or more saliency parameters associated with the first object, one or more saliency parameters associated with the second object, etc. Explained another way, the monitoring component 130 may distinguish between 'looking' and 'seeing' an object based on eye gaze trajectory, gaze point, gaze time, time of focus, depth, output of an eye tracking sensor, etc.

Similarly, the monitoring component 130 may monitor or track when one or more objects appeared in view of the driver (e.g., when an object is 'new' in an operating environment) or times when an object was within peripheral vision of the driver. As an example, if the monitoring component 130 determines that a first object is within the peripheral vision of a driver (e.g., the driver or operator has his or her eyes focused on a second object less than a threshold peripheral vision distance away) for a threshold peripheral vision time, the modeling component 120 may build an awareness model indicative of the first object being within peripheral vision of the driver. In one or more embodiments, this awareness model may be built or constructed based on a saliency model for one or more of the objects. For example, if the first object is brightly colored or otherwise stands out from the operating environment, the modeling component 120 may utilize a saliency model associated with the first object to adjust one or more aspects of the awareness model. Here, in this example, because the first object is brightly colored (e.g., as indicated by one or more object attributes or saliency parameters), an awareness score assigned to the first object may be higher than an awareness score assigned to a third object exhibiting less saliency, where the third object is the same distance away from the first object as the second object. In other words, the saliency model may influence awareness scoring or how an awareness model may be built.

As another example, when an object exhibits a high degree of saliency, contrast, etc., the distance (e.g., threshold peripheral vision distance) or radius utilized to define peripheral vision may be increased. If an operator is focused on a first object and a second object exhibiting little or no contrast with the operating environment is greater than a threshold peripheral vision distance away, the modeling component 120 may infer that the operator of the vehicle did not see that second object. However, if an operator is focused on a first object and a third object exhibiting high contrast with the operating environment is the same distance away from the first object as the second object, the modeling component 120 may infer that the operator of the vehicle did see the third object due to the saliency modeling or by increasing the threshold peripheral vision distance based on saliency parameters of the third object or a saliency model associated with the third object. In this way, a saliency model for one or more objects may be utilized to adjust or construct an awareness model (e.g., by changing threshold peripheral vision distances or threshold peripheral vision time, etc.). Accordingly, this may allow for the modeling component 120 to build an awareness model which infers that a driver has spotted an object associated with a high degree of saliency by merely glancing at the object or near (e.g., within the threshold peripheral vision distance) the object.

The monitoring component 130 may detect or sense other types of operator attributes or operator behavior. For example, the monitoring component 130 may include a microphone which detects verbal cues associated with one or more objects within the operating environment. Here, in this example, the monitoring component 130 or microphone may detect operator behavior, such as groaning when a light turns red or muttering, "aw c'mon" when a vehicle or pedestrian acts out of turn (e.g., gets to a stop sign after the vehicle but goes before the vehicle, cuts the driver off, etc.). Accordingly, the modeling component 120 may build an awareness model based on operator behavior or one or more of these operator attributes. If an operator of a vehicle groans as a light ahead turns red, the modeling component 120 may construct the awareness model with an inference that the operator has seen the light.

In one or more embodiments, the monitoring component 130 may detect one or more objects, such as intra-vehicular objects (e.g., passengers, occupants, conversations, tasks, such as peeling a banana, eating a taco, etc.) or objects within the vehicle. Additionally, the monitoring component 130 may determine a number of attention demanding objects based on one or more operator attributes (e.g., shifting of eyes, gaze distribution, detected speech or conversations, etc.). For example, if the monitoring component 130 tracks eye movement or gaze distribution utilizing a gaze detection device, a number of objects which the driver has looked at may be determined. In this example, an object may be considered an attention demanding object if the operator of the vehicle has focused on that object for a threshold amount of time (e.g., two hundred milliseconds) within a rolling time window (e.g., within the last minute). As discussed, the modeling component 120 may adjust these thresholds or time windows based on the saliency or saliency models for respective objects. The modeling component 120 may receive a count of a number of objects or a number of attention demanding objects and generate or construct an awareness model accordingly.

In one or more embodiments, the electronic control unit 140 (ECU) may receive one or more operator responses, one or more operator reactions, one or more operations, such as vehicle operations (e.g., steering, horn, turn signal, etc.) or maneuvers made by an operator of a vehicle. In other words, the electronic control unit 140 (e.g., or one or more subunits thereof) may receive information or data, such as data related to operator behavior, maneuvers or operator responses provided by the operator of the vehicle (e.g., braking, accelerating, steering, honking, shifting, activation of a turn signal, adjusting vehicle trajectory, etc.).

Because an operator response may be indicative of how a driver or operator reacts upon seeing or becoming aware of an object, this information (e.g., operator response information) may be utilized to build or construct an awareness model. Explained another way, if an operator of a vehicle sees a stop sign, it is likely that the operator will apply the brakes of the vehicle. In this regard, when the brakes are applied (e.g., or other operator responses are detected), inferences may be drawn as to whether or not an operator of a vehicle is aware of a corresponding object. Here, in this example, it may be inferred by the modeling component 120 that an operator is aware of an object when the brakes of the vehicle are applied within a threshold radius or distance from the object. The electronic control unit 140 may associate or correlate one or more operator responses with one or more objects. For example, the electronic control unit 140 may receive data, such as one or more operator responses, maneuvers, operations (e.g., honking the horn). In this example, the modeling component 120 may associate an object, such as a vehicle with the operator response of honking the horn based on movement of the object or gaze tracking. Regardless, the modeling component 120 may generate an awareness model indicative of a level of driver awareness (e.g., awareness score) with regard to an object based on one or more operator responses.

As another example, because an operator of a vehicle may be expected to response to an object or obstacle, such as a bicycler, by changing the trajectory of the vehicle such that the vehicle drifts away or farther in distance from the bicycler (e.g., by occupying a left portion of a lane while the bicycler occupies a right portion of the lane), the modeling component 120 may generate or construct the awareness model based on the trajectory of the vehicle (e.g., an operator response). In one or more embodiments, the electronic control unit 140 may receive information corresponding to the drifting of the vehicle from a steering unit or from a telematics unit. The electronic control unit 140 may include a powertrain control module (PCM), a transmission control module (TCM), a brake control module (BCM or EBCM), a central control module (CCM), a central timing module (CTM), a general electronic module (GEM), a body control module (BCM), a suspension control module (SCM), a telematics module, etc. The telematics module of the electronic control unit 140 may provide one or more navigation instructions or anticipated navigation to the modeling component 120 to facilitate predictive modeling or other modeling, according to one or more aspects.

The electronic control unit 140 may detect one or more objects based on operator interaction with the electronic control unit 140 or one or more subunits of the electronic control unit 140. For example, if an operator of a vehicle adjusts the volume of a sound system or radio of the vehicle, the electronic control unit 140 may classify the consumption of media as an object. Here, in this example, the modeling component 120 may determine that the media is an attention demanding object based on operator interaction with the volume control. After a threshold period of time (e.g., five minutes without operator interaction), the media may be classified as a non-attention demanding object. In this way, the electronic control unit 140 may monitor one or more objects or determine a number of attention demanding objects based on operator interaction with the vehicle, the electronic control unit 140, or one or more subunits of the electronic control unit 140.

Examples of objects which may be detected by the electronic control unit 140 include one or more lines of communication (e.g., personal conversations, telephone calls, text conversations, texting, dialing, etc.), execution of one or more applications (e.g., changing a radio station, adjusting the volume, running apps on the vehicle or a mobile device connected to the vehicle).

The database component 150 may include or store one or more baseline attributes, baseline operations, baseline responses (e.g., which may be associated with an operator of a vehicle). Examples of baseline responses may include typical reaction times in response to an operator seeing an object, average clearance given to objects, obstacles, or obstructions, average number of objects an operator multi-tasks between, etc. In other words, the sensor component 110 may detect or identify one or more objects, the modeling component 120 may construct an operating environment model indicative of one or more of the objects, and the database component 150 may house or store one or more expected response attributes for one or more corresponding objects for comparison to facilitate abnormal behavior detection or anomalous behavior detection.

As an example, if a pedestrian is detected by the sensor component 110, the modeling component 120 may construct an operating environment model indicative of that pedestrian as an object or potential obstacle within the operating environment. The database component 150 may house expected response information or expected response attributes for a pedestrian or similar object. The modeling component 120 may compare current operator response information with the expected response information from the database component 150 to facilitate formation of an awareness model or an awareness score for the pedestrian. Examples of expected response information or expected response attributes may include a distance at which an operator of a vehicle generally begins steering away from an object or obstacle, whether or not an operator decreases velocity of the vehicle, a rate of change in steering angle over time, etc.

In one or more embodiments, a learning component 152 may receive one or more operator responses and object attributes and update expected response attributes or expected response information accordingly (e.g., utilizing a rolling data store). Additionally, feedback may be received (e.g., via an interface component 154) from an operator of a vehicle to supplement or adjust one or more of the expected response attributes. For example, a saliency model associated with an object may be adjusted if an operator of a vehicle has difficulty perceiving differences in color. Here, in this example, the learning component 152 may adjust baseline information associated with one or more saliency parameters if an operator systematically fails to identify or be aware of objects based on color differences. In this way, the learning component 152 may update expected response attributes or other baseline information in the database component 150, thereby enabling a system 100 for saliency based awareness modeling to be trained by an operator of a vehicle during usage. Similarly, other types of baseline information may be included or stored by the database component 150, such as expected response attributes indicative of one or more operator attributes (e.g., typical or baseline gaze distribution of an operator), one or more operator responses (e.g., baseline reaction time, baseline clearance distance, etc.), one or more object attributes (e.g., shades of color recognized, threshold amount of saliency for object awareness to define high degree of saliency), etc.

The modeling component 120 may build, construct, or generate an awareness model based on an operating environment model representing one or more objects, a saliency model for one or more of the objects, a predictive model for one or more of the objects, baseline information associated with one or more objects, operator behavior, operator responses, or operator attributes. The awareness model may include one or more awareness scores corresponding to one or more objects of the operating environment model. Respective awareness scores may be indicative of a probability that an operator of a vehicle is aware of the object, given detected information (e.g., from the sensor component 110, the monitoring component 130, the electronic control unit 140, the database component 150, etc.).

In one or more embodiments, the modeling component 120 may construct the awareness model based on a saliency model for one or more objects within the operating environment. The modeling component 120 may adjust a saliency model for one or more objects based on a time of day, day of week, length of a trip, duration of a trip, driving conditions, a state of an operator (e.g., drowsiness), level of traffic, proximity of an object, size of an object, etc. For example, if a driver has been driving for four hours, his or her perception may be affected by fatigue, and as a result, the modeling component 120 may adjust the saliency model for one or more corresponding objects to reflect a lower likelihood of awareness than usual. Here, in this example, if an object is bright pink (e.g., exhibits a high degree of visual saliency), the modeling component 120 may generate an awareness model indicative of a 99% chance that an operator is aware of the bright pink object during the first hour of a trip. However, as the duration of the trip increases (e.g., 8 hours into a trip), the modeling component 120 may update the awareness model to indicate a lesser chance (e.g., an 85% chance) that the operator would be aware of the same or similar object.

Further, the modeling component 120 may generate the awareness model in a situational or context dependent manner. For example, during a scenario where traffic is low or light, awareness scores for objects may be assigned differently than when traffic is heavy. The modeling component 120 may generate the awareness model based on one or more aspects of the operating environment model. For example, awareness may be based on whether a vehicle is traveling on a straightaway, a highway, a curved roadway (e.g., when the roadway is curved, an operator may be less aware of objects or obstacles due to focus on steering), etc. In this way, the operating environment model may be utilized to generate or influence the awareness model.

The awareness model may be updated on a continual basis based on updated information received by the sensor component 110, the monitoring component 130, the electronic control unit 140, the database component 150, etc. In one or more embodiments, the modeling component 120 may group or aggregate one or more objects when respective objects share one or more attributes, such as proximity between objects (e.g., a plurality of pedestrians crossing a crosswalk), direction of movement, origin location, etc.

For example, if an emergency vehicle is equipped with an emergency lighting system which is activated, an operator of a vehicle is likely to have seen the emergency vehicle due to the flashing lights of the emergency lighting system. When the emergency lighting system is deactivated, the modeling component 120 may mark or tag the emergency vehicle as 'previously salient' due to the emergency lighting system. In this regard, the modeling component 120 may tag one or more objects within an awareness model as 'previously salient' at a prior time. Accordingly, notifications may be provided or omitted based on one or more 'previously salient' tags and an elapsed time associated therewith. In other words, the modeling component 120 may generate an awareness model which provides data (e.g., the 'previously salient' tag) indicative that a corresponding object was likely to have been visible at a prior time. Accordingly, in this example, an awareness model may be generated which indicates a high level of awareness or a high awareness score for the emergency vehicle. The management component 180 may then omit generation of an alert or notification for the emergency vehicle, thereby mitigating distractions for the operator of the vehicle.

In one or more embodiments, the modeling component 120 may construct a saliency model for an object based on a peak saliency (e.g., observed by the sensor component 110) or a maximum saliency detected for that object. In this way, changes to the saliency of the object may be 'remembered'. In other words, the modeling component 120 may build an awareness model or a saliency model which accounts for objects a driver or operator has already seen (e.g., even if an object changes in state or in saliency). The modeling component 120 may construct a predictive model which may be indicative of a decay (e.g., after a threshold period of time, incrementally, etc.) or decrease in awareness after a change in state or a change in saliency for an object is detected. The decay or decrease in awareness may be modeled based on a step function, a linear function, a power function, an original color of the object, one or more object attributes, etc. As an example, if an object is bright pink, the rate of decay or the decrease in awareness associated with the predictive model may be minor. In this way, the modeling component 120 may generate one or more models indicative of whether objects are fresh, stale, new, flashy, memorable, etc. Further, notifications for one or more objects may be generated or redundant notifications may be mitigated according to one or more of the models (e.g., awareness, saliency, predictive, etc.).

Conversely, if an object exhibits a high degree of saliency, but a change in state or saliency causes that object to exhibit a low degree of saliency below a threshold level, the modeling component 120 may generate a saliency model for the object as if the object was never highly visible. In other words, a saliency model may be constructed which accounts for 'disappearance' of an object which was at one time highly visible.

The modeling component 120 may receive a count of a number of objects detected (e.g., among the sensor component 110, the monitoring component 130, the electronic control unit 140, etc.). Further, the modeling component 120 may determine a number of attention demanding objects from one or more components of the system 100 for saliency based awareness modeling. For example, objects associated with the electronic control unit 140 may generally be attention demanding when an operator of a vehicle provides a user input, such as by changing the volume on a sound system or by selecting a different channel, etc. The monitoring component 130 may capture one or more images over a rolling period of time to determine a number of objects the driver or operator has focused on for a threshold period of time or predetermined amount of time (e.g., for objects which a gaze is directed for three or more seconds). Here, the monitoring component 130 may update the database component 150 with an average number of objects an operator multi-tasks between as a baseline.

Further, the modeling component 120 may update the awareness model based on a comparison between a current number of objects a driver of a vehicle is multi-tasking between and the baseline or average number of objects the driver typically switches between. In other words, the modeling component 120 may adjust the awareness model based on a comparison of current operator attributes against baseline operator attributes, historical operator attributes, historical operator behavior, or baseline operator behavior. In this way, the modeling component 120 may provide for anomalous behavior detection. Further, the modeling component 120 may build or construct one or more models based on operator preferences, user preferences, one or more conditions, one or more rules, feedback (e.g., customization of alerts or notifications), etc.

In one or more embodiments, the modeling component 120 may generate a graphical representation of a saliency model or a graphical representation of an awareness model. An operator of a vehicle may utilize these graphical representations to identify 'blind spots' in their driving accordingly.

The scoring component 160 may determine or calculate one or more awareness scores for one or more objects. An awareness score may be indicative of how aware or how likely an operator is aware of an object or awareness with regard to the surroundings of the operator, such as the operating environment. In other words, the scoring component 160 may calculate or determine a probability or a likelihood that an operator is aware of an object within an operating environment through which a vehicle is traveling. Explained yet another way, the scoring component 160 may calculate a likelihood that a driver or operator of a vehicle sees an object such that the operator will react, behave, or respond in a safe manner, such as by steering the vehicle around the object, engaging the brakes of the vehicle, honking the horn, etc. In one or more embodiments, an awareness score may be expressed as a percentage (e.g., 75% or 0.75).

In one or more embodiments, the scoring component 160 may assign one or more awareness scores to one or more objects associated with an awareness model based on a saliency model for one or more of the objects, a predictive model for one or more of the objects, etc. As an example, an awareness score may be indicative of a likelihood or probability that an operator is aware of an object given operator behavior, operator attributes, or object attributes. In one or more embodiments, this probability may be expressed as Pr (awareness|operator behavior, operator attributes, object attributes). This probability may be calculated based on Pr (awareness|object saliency), Pr (awareness|operator behavior), Pr (awareness|other object attributes), etc.

The notification component 170 may provide one or more notifications regarding one or more objects within an operating environment. The notification component 170 may include an audio device (e.g., speakers), a display device (e.g., touchscreen, heads-up-display or HUD, three-dimensional displays or 3-D displays), a tactile feedback device (e.g., provides vibration or tactile feedback), a communication device (e.g., provides email notifications, text notifications, etc.). In one or more embodiments, feedback or notifications may be provided to passengers or other occupants of a vehicle in addition to an operator of a vehicle. Additionally, higher scoring (e.g., awareness scores) objects may be brought to the attention of passengers. For example, if an operator of a vehicle is highly likely to be aware of an object, a passenger may be presented with a notification for that object, thereby utilizing passenger cognition rather than operator cognition. In one or more embodiments, the notification component 170 may be integrated with a navigation component. In other words, one or more notifications may be provided in conjunction with navigation from an origin location to a destination location.

The management component 180 may control how notifications may be shown, presented, or rendered. In other words, the management component 180 may determine whether or not to notify or alert an operator or driver with regard to one or more objects based on one or more awareness scores or an awareness model associated with one or more of the objects. In one or more embodiments, the management component 180 may sort one or more of the objects by awareness score and render notifications for one or more of the objects above or below a threshold awareness score level. In other words, the management component 180 may select a number of objects which a driver is estimated or least likely to be aware of, and have the notification component 170 render notifications for respective objects (e.g., for presentation to the operator of the vehicle).

In this way, the management component 180 may filter or select objects and selectively present one or more notifications for one or more of the selected objects to an operator of a vehicle in a context appropriate manner. In one or more embodiments, the management component 180 may rank or select one or more objects which have an awareness score greater than or less than a threshold awareness score for notification or alert. In this way, the management component 180 may selectively provide notifications based on saliency or driver behavior.

For example, a system 100 for saliency based awareness modeling may score a law enforcement vehicle object such that notifications associated with that law enforcement vehicle object are omitted when lights of the law enforcement vehicle are engaged in a manner which enhances visibility or saliency of the law enforcement vehicle object. Additionally, when the lights for the law enforcement vehicle object are turned off, the system 100 for saliency based awareness modeling may track the law enforcement vehicle and prevent notifications from being generated based on a likelihood that an operator has already seen the law enforcement vehicle object (e.g., when the lights of the law enforcement vehicle object were activated).

The management component 180 may manage the timing of notifications, a number of notifications to be rendered, volume of notifications, extent, size, color, etc. As discussed, the modeling component 120 may receive a count for a number of attention demanding objects. If a driver or operator of a vehicle is multi-tasking between a large number (e.g., greater than a baseline number stored in the database component 150 or another threshold number) of attention demanding objects, the management component 180 may cause the notification component 170 to render notifications for high priority objects (e.g., objects associated with a low awareness score below a threshold awareness level and a high estimated risk score above a desired risk level). Further, the management component 180 may adjust the order of notifications based on the awareness model, the saliency model, or the predictive model, etc.

Conversely, the management component 180 may limit or reduce a number of notifications for an operator of a vehicle if there are excess distractions (e.g., above a threshold number of attention demanding objects) to mitigate multi-tasking. Here, in this example, if a driver is busy multi-tasking, but the roadway is relatively clear aside from a low risk object, the management component 180 may negate the associated notification for that low risk object. In other words, the management component 180 may disable notifications when appropriate (e.g., when a driver is aware of a corresponding object), thereby mitigating excessive notifications based on context or situational awareness.

Because an operator or a driver of a vehicle may only pay attention to a limited number of objects, obstacles, tasks, notifications, alerts, etc., redundant presentation of alerts or notifications may be mitigated or managed according to the context of an operating scenario, saliency, driving conditions, operator behavior, or operator responses, thereby reducing the amount of operator cognition consumed.

Figure 2:
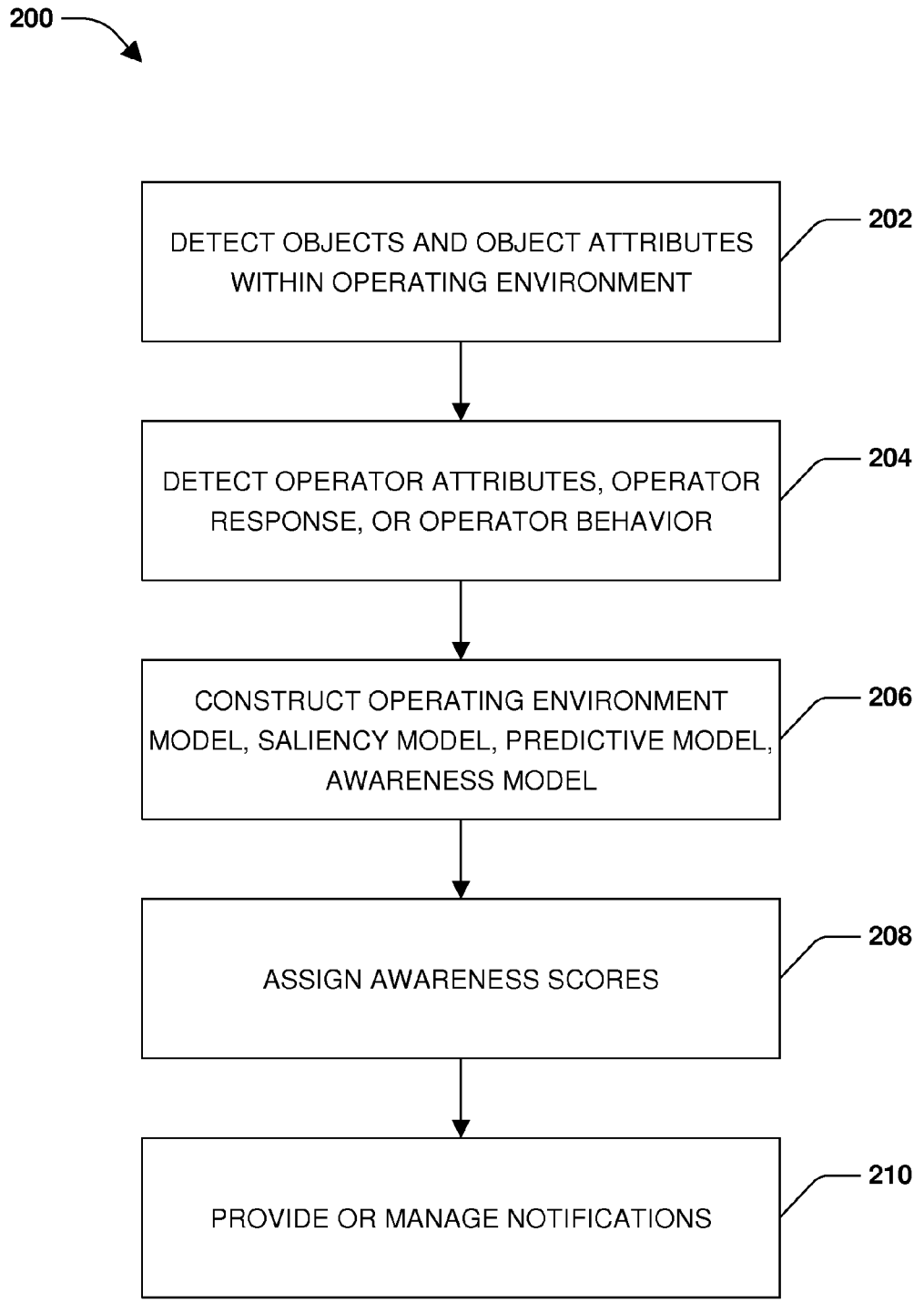
FIG. 2 is an illustration of an example flow diagram of a method for saliency based awareness modeling, according to one or more embodiments.

FIG. 2 is an illustration of an example flow diagram of a method 200 for saliency based awareness modeling, according to one or more embodiments. At 202, one or more objects (e.g., from an operating environment) or corresponding object attributes may be detected. At 204, operator attributes, operator responses, or operator behavior may be detected. At 206, one or more models may be built, assembled, or constructed based on information from 202 or 204. For example, an operating environment model may be constructed based on detected objects or object attributes. Similarly, a saliency model may be constructed based on object attributes associated with saliency. Predictive models may be constructed for one or more objects based on operator responses or operator behavior. An awareness model may be assembled based on one or more of the other models or information from 202 or 204. Awareness scores may be assigned at 208 and notifications may be provided based on respective scores at 210.

Figure 3:
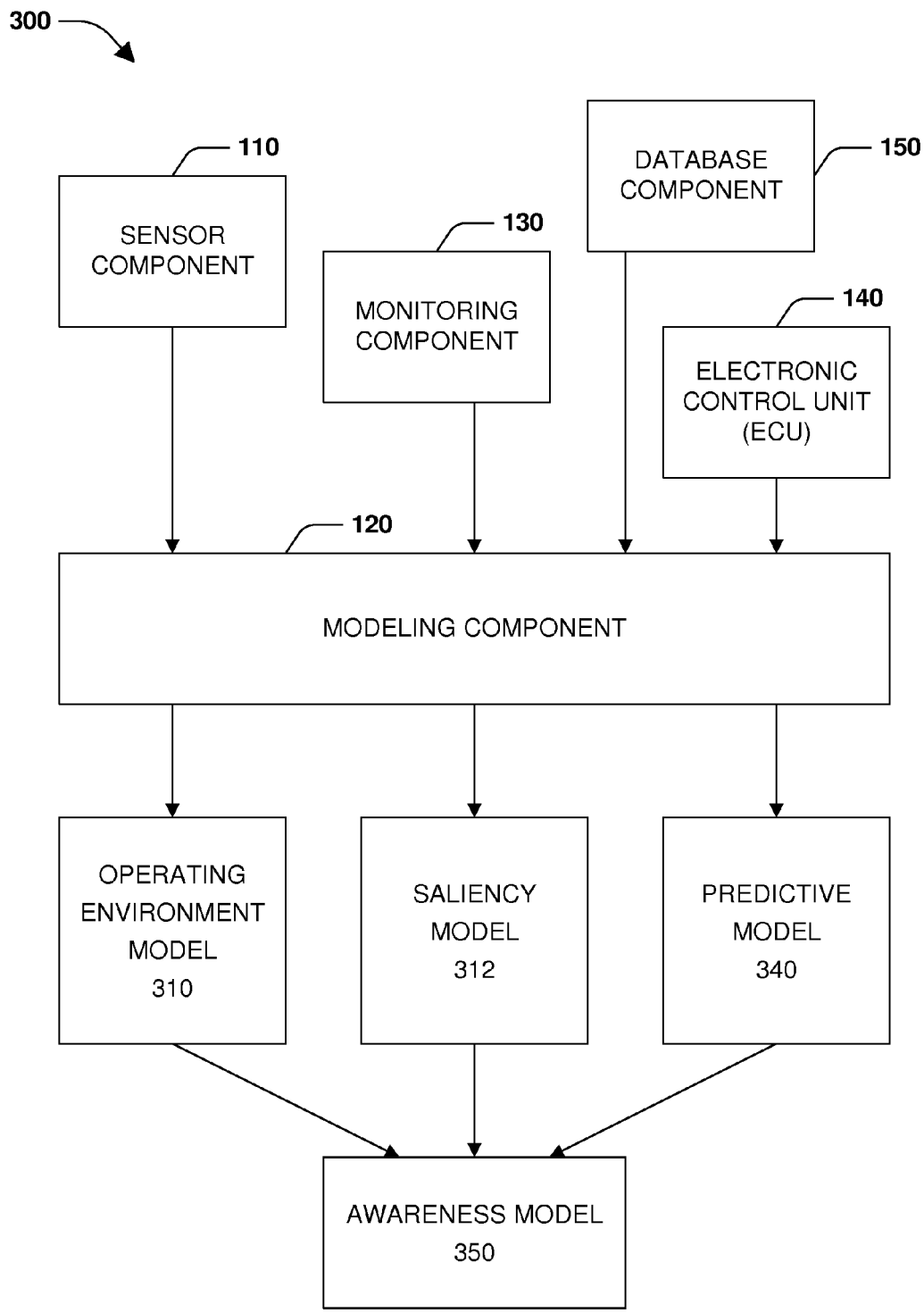
FIG. 3 is an illustration of the generation of an example saliency based awareness model, according to one or more embodiments.
Figure 4:
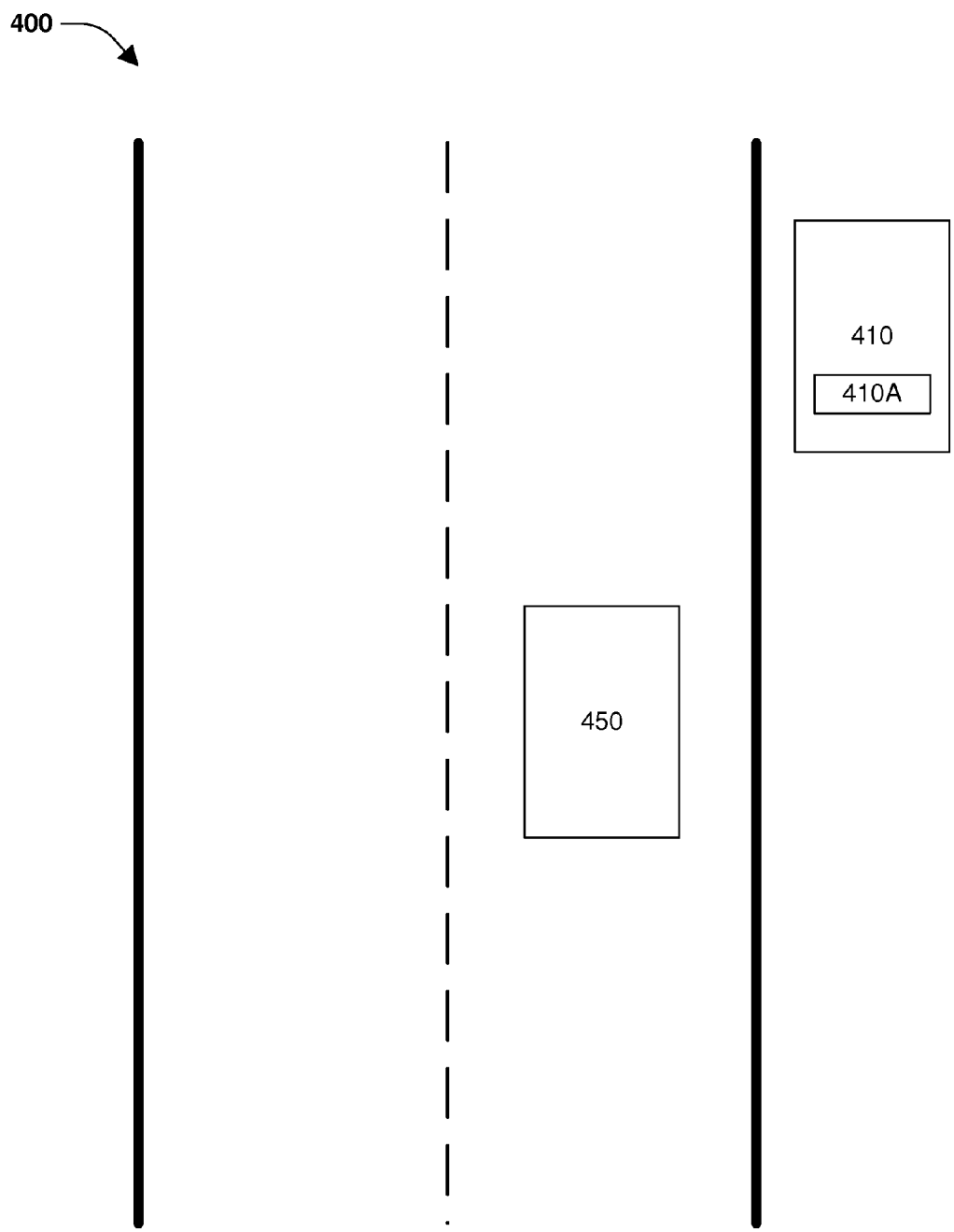
FIG. 4 is an illustration of an example operating environment, according to one or more embodiments.

FIG. 3 is an illustration of the generation 300 of an example saliency based awareness model, according to one or more embodiments. FIG. 3 and FIG. 4 are described with respect to one or more components of the system 100 for saliency based awareness modeling of FIG. 1. Here, information, data, etc. may be collected or aggregated from the sensor component 110, the monitoring component 130, the database component 150, the electronic control unit 140, or other components of the system 100 and fed to the modeling component 120. The modeling component may utilize this data to build or construct an operating environment model 310, a saliency model 312, or a predictive model 340 for one or more objects. As an example, the sensor component 110 may detect one or more object attributes, such as saliency or movement and the modeling component may build the operating environment model 310 based on input from the sensor component 110. Similarly, the monitoring component 130 may detect one or more operator attributes, such as eye movement or gaze distribution of an operator of a vehicle and the modeling component 120 may build a predictive model 340 or awareness model 350 based thereon. The database component 150 may provide baseline information to the modeling component 120 for comparison against information or data received from the other sensors or components, such as the sensor component 110, the monitoring component 130, or the electronic control unit 140. The modeling component 120 may build the predictive model 340 or the awareness model 350 based on such comparisons. Additionally, the electronic control unit 140 may detect one or more operator responses or operator behavior to facilitate construction of the predictive model 340 or the awareness model 350.

FIG. 4 is an illustration of an example operating environment 400, according to one or more embodiments. In this example, a vehicle 450 may be equipped with a system 100 for saliency based awareness modeling. 410 may be a law enforcement vehicle equipped with a system for emergency lighting 410A. When the sensor component 110 of the system 100 detects that the emergency lighting 410A is activated, the modeling component 120 may construct an awareness model which assigns a high awareness score (e.g., 95%) to the object 410 or law enforcement vehicle. Notifications associated with the object 410 may be mitigated by a management component 180, thereby causing an operator of a vehicle to utilize or expend less attention on excess notifications.

Figure 5:
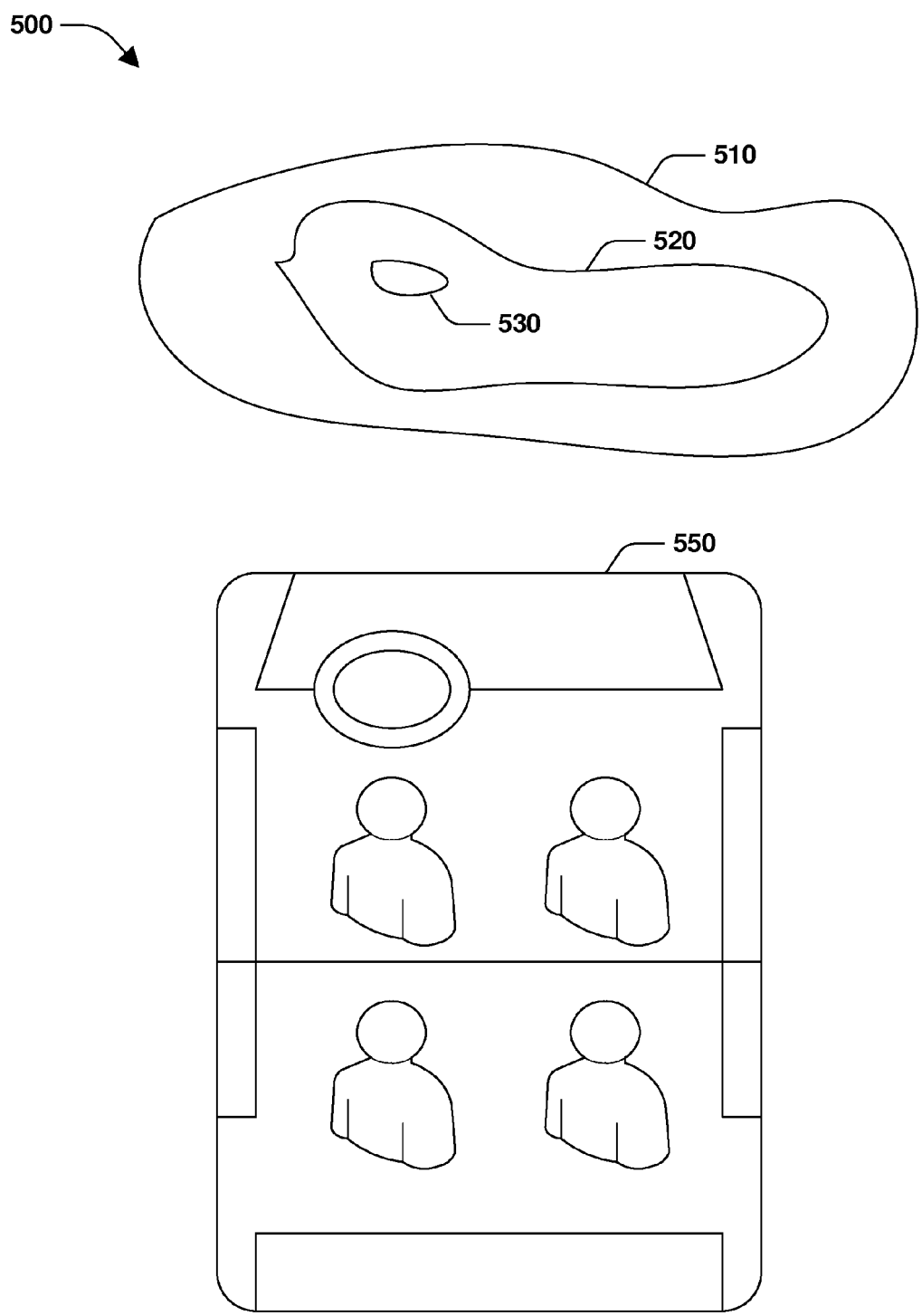
FIG. 5 is an illustration of an example graphical representation of an awareness model or a saliency model, according to one or more embodiments.

FIG. 5 is an illustration of an example graphical representation 500 of an awareness model or a saliency model, according to one or more embodiments. A vehicle 550 may have a driver and/or one or more passengers or other occupants. The graphical representation of an awareness model or saliency model may have one or more regions, such as regions 510, 520, and 530. Respective regions may be indicative of likelihood that a driver is aware of objects within those regions. In one or more embodiments, the graphical representation 500 may be color coded. For example, region 530 may be red, region 520 may be yellow, and region 510 may be grey. The red and yellow may be indicative of a higher likelihood of awareness of objects within those regions, while grey may be indicative of a lower likelihood of awareness of objects within those regions.

Because saliency based awareness modeling may provide a probability distribution indicative of a likelihood of whether a driver or operator of a vehicle is aware of one or more objects, a system or method for saliency based awareness modeling is not merely an application of an abstract idea to a technological environment. For example, saliency based awareness modeling may improve the functioning of a computer by selecting one or more objects or target objects for notification, thereby reducing a processing load for a processing unit (e.g., because the processing unit will not be required to render a notification for all detected objects). Further, a system or method for saliency based awareness modeling may effect an improvement in the technological field of vehicular navigation, vehicular notifications, vehicle safety, or in-vehicle infotainment by mitigating unnecessary distractions, alerts, notifications, or other attention demanding objects. Additionally, the system or method for saliency based awareness modeling may further effect improvements in respective technological fields by drawing the attention of the operator of a vehicle to fewer notifications, thereby helping a driver or operator focus on featured notifications while compensating, adjusting, or taking into account saliency of objects with respect to variables which may affect saliency.

One or more embodiments may employ various artificial intelligence (AI) based schemes for carrying out various aspects thereof. One or more aspects may be facilitated via an automatic classifier system or process. A classifier is a function that maps an input attribute vector, x=(x1, x2, x3, x4, xn), to a confidence that the input belongs to a class. In other words, f(x)=confidence (class). Such classification may employ a probabilistic or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression utilized to develop models of priority.

One or more embodiments may employ classifiers that are explicitly trained (e.g., via a generic training data) as well as classifiers which are implicitly trained (e.g., via observing user behavior, receiving extrinsic information). For example, SVMs may be configured via a learning or training phase within a classifier constructor and feature selection module. Thus, a classifier may be used to automatically learn and perform a number of functions, including but not limited to determining according to a predetermined criteria.

Figure 6:
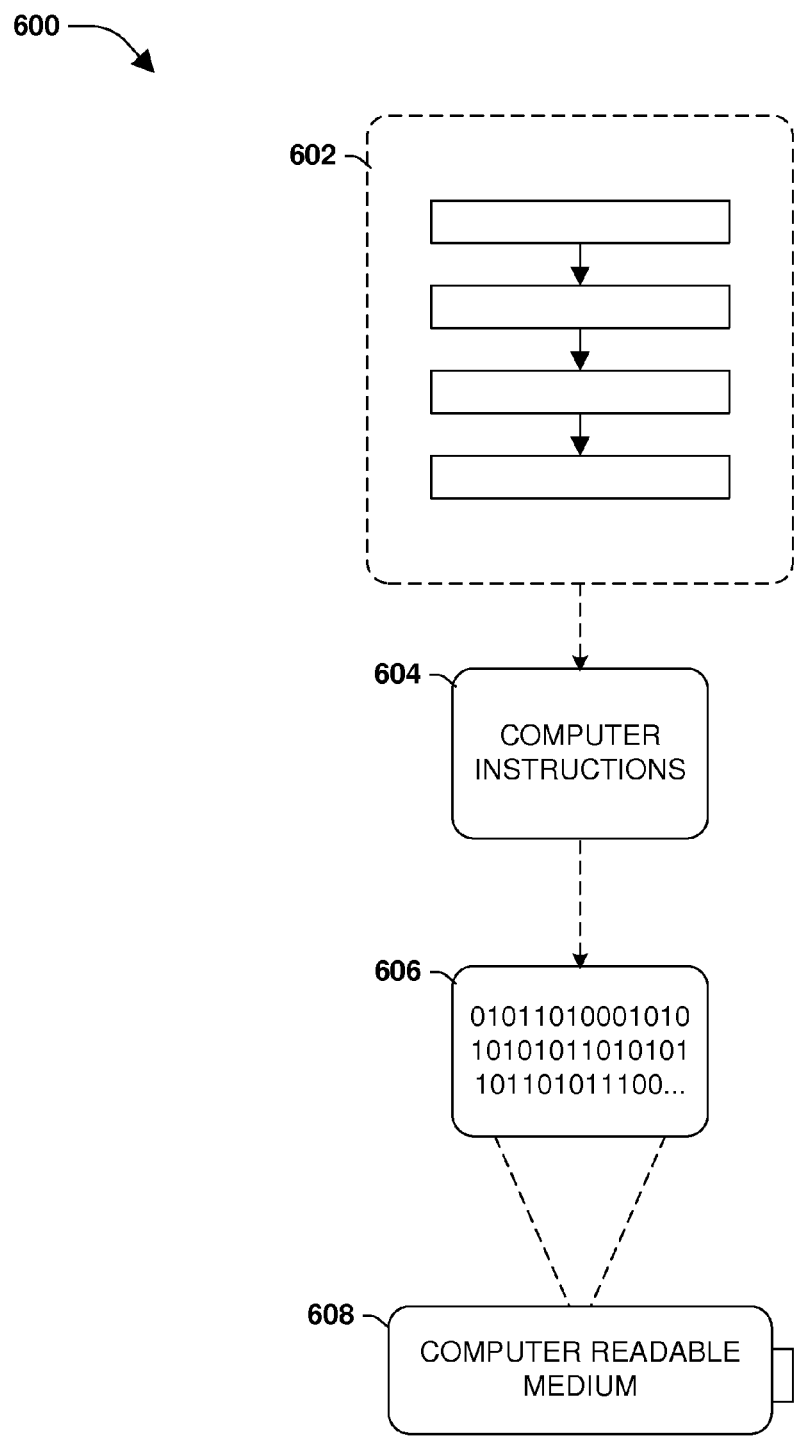
FIG. 6 is an illustration of an example computer-readable medium or computer-readable device including processor-executable instructions configured to embody one or more of the provisions set forth herein.

Still another embodiment involves a computer-readable medium including processor-executable instructions configured to implement one or more embodiments of the techniques presented herein. An embodiment of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This computer-readable data 606, such as binary data including a plurality of zero's and one's as shown in 606, in turn includes a set of computer instructions 604 configured to operate according to one or more of the principles set forth herein. In one such embodiment 600, the processor-executable computer instructions 604 may be configured to perform a method 602, such as the method 200 of FIG. 2. In another embodiment, the processor-executable instructions 604 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 7 and the following discussion provide a description of a suitable computing environment to implement embodiments of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one or more embodiments provided herein. In one configuration, computing device 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other embodiments, device 712 includes additional features or functionality. For example, device 712 may include additional storage such as removable storage or non-removable storage, including, but not limited to, magnetic storage, optical storage, etc. Such additional storage is illustrated in FIG. 7 by storage 720. In one or more embodiments, computer readable instructions to implement one or more embodiments provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 712. Any such computer storage media is part of device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 712 includes input device(s) 724 such as keyboard, mouse, pen, voice input device, touch input device, infrared cameras, video input devices, or any other input device. Output device(s) 722 such as one or more displays, speakers, printers, or any other output device may be included with device 712. Input device(s) 724 and output device(s) 722 may be connected to device 712 via a wired connection, wireless connection, or any combination thereof. In one or more embodiments, an input device or an output device from another computing device may be used as input device(s) 724 or output device(s) 722 for computing device 712. Device 712 may include communication connection(s) 726 to facilitate communications with one or more other devices.

According to one or more aspects, a system for saliency based awareness modeling is provided, including a sensor component, a monitoring component, a modeling component, and a scoring component. The system may include an electronic control unit (ECU), a database component, a notification component, or a management component. The sensor component may detect one or more objects within an operating environment and one or more object attributes for one or more of the objects. One or more of the object attributes are associated with saliency of one or more of the objects. The monitoring component may detect one or more operator attributes of an operator of a vehicle. The modeling component may construct a saliency model for one or more of the objects based on one or more of the attributes associated with saliency of one or more of the objects. The modeling component may construct an awareness model for one or more of the objects based on the saliency model and one or more of the operator attributes. The a scoring component may assign one or more awareness scores to one or more objects of the awareness model based on the saliency model and one or more of the operator attributes.

The system may include an electronic control unit (ECU) receiving one or more operator responses or operator behavior associated with the operator of the vehicle. The modeling component may construct the awareness model based on one or more of the operator responses. The system may include a database component housing baseline operator response information. The modeling component may construct the awareness model based on a comparison between the baseline operator response information and one or more of the operator responses. The system may include a notification component generating one or more notifications based on one or more awareness scores for one or more of the objects. The system may include a management component controlling a timing, a color, or a size of one or more of the notifications.

In one or more embodiments, the sensor component may include an image capture device, a radar sensor, a light detection and ranging (LIDAR) sensor, a laser sensor, a video sensor, or a movement sensor. The monitoring component may include an image capture sensor, a motion sensors, an eye tracking unit, an infrared sensor, an infrared illuminator, or a depth sensor. One or more of the object attributes may include velocity, color, contrast, color saturation, brightness, or a detected transient for one or more of the objects. One or more of the operator attributes may include eye movement, head movement, focus, facial trajectory, eye gaze trajectory, or gaze distribution.

According to one or more aspects, a method for saliency based awareness modeling is provided, including detecting one or more objects within an operating environment, detecting one or more object attributes for one or more of the objects, wherein one or more of the object attributes are associated with saliency of one or more of the objects, detecting one or more operator attributes of an operator of a vehicle, receiving one or more operator responses provided by the operator of the vehicle, constructing a saliency model for one or more of the objects based on one or more of the attributes associated with saliency of one or more of the objects, constructing an awareness model for one or more of the objects based on the saliency model, one or more of the operator responses, and one or more of the operator attributes, and assigning one or more awareness scores to one or more objects of the awareness model based on the saliency model, one or more of the operator responses, and one or more of the operator attributes.

The method may include constructing an awareness model based on a comparison between baseline operator response information and one or more of the operator responses. In one or more embodiments, the awareness model may be constructed based on other factors. For example, the method may include constructing the awareness model based on a comparison between baseline object attribute information and one or more of the object attributes. As another example, the method may include constructing the awareness model based on a comparison between baseline operator attribute information and one or more of the operator attributes. Other combinations may be possible. The method may include rendering one or more notifications based on one or more awareness scores for one or more of the objects during navigation from an origin location to a destination location or managing one or more aspects of one or more of the notifications.

According to one or more aspects, a system for saliency based awareness modeling is provided, including a sensor component, a monitoring component, a modeling component, a scoring component, and a notification component. The sensor component may detect one or more objects within an operating environment and one or more object attributes for one or more of the objects. The sensor component may detect one or more of the object attributes associated with saliency of one or more of the objects. The monitoring component may detect one or more operator attributes of an operator of a vehicle. The modeling component may construct a saliency model for one or more of the objects based on one or more of the attributes associated with saliency of one or more of the objects. The modeling component may construct an awareness model for one or more of the objects based on the saliency model and one or more of the operator attributes. The scoring component may assign one or more awareness scores to one or more objects of the awareness model based on the saliency model and one or more of the operator attributes. The notification component may generate one or more notifications based on one or more awareness scores for one or more of the objects.

The sensor component may be a gaze detection device tracking eye movement or gaze distribution. The system may include an electronic control unit (ECU) determining a number of attention demanding objects based on user interaction with one or more subunits of the ECU. The modeling component may construct the awareness model based on the number of attention demanding objects.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system for saliency based awareness modeling, comprising:
    a sensor component detecting one or more objects within an operating environment and one or more object attributes for one or more of the objects, wherein one or more of the object attributes are associated with saliency of one or more of the objects;
    a monitoring component detecting one or more operator attributes of an operator of a vehicle;
    a modeling component constructing:
        a saliency model for one or more of the objects based on one or more of the attributes associated with saliency of one or more of the objects; and
        an awareness model for one or more of the objects based on the saliency model and one or more of the operator attributes; and
    a scoring component assigning one or more awareness scores to one or more objects of the awareness model based on the saliency model and one or more of the operator attributes,
    wherein the sensor component, the monitoring component, the modeling component, or the scoring component is implemented via a processing unit.

2. The system of claim 1, comprising an electronic control unit (ECU) receiving one or more operator responses or operator behavior associated with the operator of the vehicle.

3. The system of claim 2, wherein the modeling component constructs the awareness model based on one or more of the operator responses.

4. The system of claim 2, comprising a database component housing baseline operator response information, wherein the modeling component constructs the awareness model based on a comparison between the baseline operator response information and one or more of the operator responses.

5. The system of claim 1, comprising a notification component generating one or more notifications based on one or more awareness scores for one or more of the objects.

6. The system of claim 5, comprising a management component controlling a timing, a color, or a size of one or more of the notifications.

7. The system of claim 1, wherein the sensor component comprises an image capture device, a radar sensor, a light detection and ranging (LIDAR) sensor, a laser sensor, a video sensor, or a movement sensor.

8. The system of claim 1, wherein the monitoring component comprises an image capture sensor, a motion sensors, an eye tracking unit, an infrared sensor, an infrared illuminator, or a depth sensor.

9. The system of claim 1, wherein one or more of the object attributes comprises velocity, color, contrast, color saturation, brightness, or a detected transient for one or more of the objects.

10. The system of claim 1, wherein one or more of the operator attributes comprises eye movement, head movement, focus, facial trajectory, eye gaze trajectory, or gaze distribution.

11. A method for saliency based awareness modeling, comprising:
    detecting, using a sensor component, one or more objects within an operating environment;

detecting one or more object attributes for one or more of the objects, wherein one or more of the object attributes are associated with saliency of one or more of the objects;

detecting one or more operator attributes of an operator of the vehicle;

receiving one or more operator responses provided by the operator of the vehicle;

constructing a saliency model for one or more of the objects based on one or more of the attributes associated with saliency of one or more of the objects;

constructing an awareness model for one or more of the objects based on the saliency model, one or more of the operator responses, and one or more of the operator attributes; and assigning one or more awareness scores to one or more objects of the awareness model based on the saliency model, one or more of the operator responses, and one or more of the operator attributes, wherein the detecting, the receiving, the constructing, or the assigning is implemented via a processing unit.

12. The method of claim 11, comprising constructing the awareness model based on a comparison between baseline operator response information and one or more of the operator responses.

13. The method of claim 11, comprising constructing the awareness model based on a comparison between baseline object attribute information and one or more of the object attributes.

14. The method of claim 11, comprising constructing the awareness model based on a comparison between baseline operator attribute information and one or more of the operator attributes.

15. The method of claim 11, comprising rendering one or more notifications based on one or more awareness scores for one or more of the objects during navigation from an origin location to a destination location.

16. The method of claim 15, comprising managing one or more aspects of one or more of the notifications.

17. A system for saliency based awareness modeling, comprising:
    a sensor component detecting one or more objects within an operating environment and one or more object attributes for one or more of the objects, wherein one or more of the object attributes are associated with saliency of one or more of the objects;
    a monitoring component detecting one or more operator attributes of an operator of a vehicle;
    a modeling component constructing:
        a saliency model for one or more of the objects based on one or more of the attributes associated with saliency of one or more of the objects; and
        an awareness model for one or more of the objects based on the saliency model and one or more of the operator attributes;
    a scoring component assigning one or more awareness scores to one or more objects of the awareness model based on the saliency model and one or more of the operator attributes; and
    a notification component generating one or more notifications based on one or more awareness scores for one or more of the objects,
    wherein the sensor component, the monitoring component, the modeling component, the scoring component, or the notification component is implemented via a processing unit.

18. The system of claim 17, wherein the sensor component is a gaze detection device tracking eye movement or gaze distribution.

19. The system of claim 17, comprising an electronic control unit (ECU) determining a number of attention demanding objects based on user interaction with one or more subunits of the ECU.

20. The system of claim 19, wherein the modeling component constructs the awareness model based on the number of attention demanding objects.

* * * * *